Reissued June 26, 1951 Re. 23,382

UNITED STATES PATENT OFFICE 23,382

STEAM-SET PRINTING INK

Alfred F. Schmutzler, Teaneck, N. J., and
Donald F. Othmer, Coudersport, Pa.

No Drawing. Original No. 2,482,879, dated September 27, 1949, Serial No. 569,716, October 27, 1944. Application for reissue September 22, 1950, Serial No. 186,324

21 Claims. (Cl. 106—24)

Matter enclosed in heavy brackets [ ] appears in the original patent but forms no part of this reissue specification; matter printed in italics indicates the additions made by reissue.

This invention relates to printing inks, and more particularly to printing inks which harden by exposure to steam.

Printing inks which harden by the application of moisture in the form of steam or water, consist of compositions made from a water-miscible liquid such as ethylene glycol, diethylene glycol or the like, in which there is dispersed a water-insoluble binder such as zein, a resin and a coloring material such as a pigment of the character of carbon black, chrome yellow, or the like, or a dyestuff. The hardening of the ink is caused by exposing a printed film to steam or water. During the process of setting, the water-miscible liquid absorbs sufficient water to cause the precipitation of the binder and the pigment. Due to the nature of the process, it is necessary for the binder to be sufficiently moisture-sensitive so that the addition of water to the organic liquid causes its separation, but the binder should have an adequate tolerance for moisture so that it will not prematurely precipitate.

Usually inks made with zein are too sensitive to high humidities, such as about 50%, resulting in a breakdown on the printing press, with consequent failure of proper distribution on the rollers and the resultant failure of the printing process.

Printing inks made by suspending coloring materials in a colloidal dispersion of from 20 to 35% of soybean proteins, said proteins containing from 95% upwards of pure protein dispersion in diethylene glycol, using 6% of guanidine carbonate as the dispersing agent, and made up to an apparent viscosity of 10 to 30 poises as described by Schmutzler and Othmer, Industrial and Engineering Chemistry, 35: 1196–1202 (1943), have a tolerance for moisture and therefore, as contrasted with zein protein inks, do not break down on the press at high humidities and satisfactorily harden if their printed films are exposed to steam. They may be used where water resistance of the printed film is not a factor of paramount importance. This soybean-protein diethylene glycol dispersion can be used with high oil absorption pigments, such as carbon black, benzidene yellow, Prussian blue and the like.

Printing inks prepared from colloidal dispersions of other vegetable proteins such as alkaline extracted corn proteins, cottonseed globulin, hempseed globulin or the like, made up as the soybean protein ink above described to similar concentrations in diethylene glycol with a corresponding amount of peptizing agent, resemble the soybean protein inks in characteristics and performance.

Printing inks made from dispersions of casein and other proteins of animal origin such as blood albumin, gelatin or the like, in polyhydric alcohols set to harder films than those made from soybean protein. When the protein dispersions are made up to viscosities higher than 30 poises, they are found to possess greater binding characteristics than the lower viscosity dispersions.

It is also to be noted that printing inks made of the foregoing materials are usually alkaline in character. The alkalinity of the dispersions is a disadvantage as it sometimes causes a change in the hue of the coloring materials and sometimes effects the light-fastness thereof.

If the high viscosity dispersions are acidified, there is a decrease in the water absorption of the dry ink films.

All colloidal dispersions of these proteins, as contrasted with zein, may be blended with resins resulting in improved consistency of the ink as well as improved resistance of the printed film. In blends with resins, the protein dispersions usually impart hardness and moisture tolerance to the printing inks and sometimes plastic flow. Resinous materials such as long polymerized phenol modified indene coumarone resin, a complex phenolic compound of the group comprising partially polymerized phenol modified indene coumarone resins, alkyd resins, urea formaldehyde resins, rosin or the like, may be used for such purposes.

If neutralized or slightly acid dispersions are to be used instead of the alkaline dispersions, it is advantageous to effect the neutralization or slight acidification of the alkaline peptizing agents by the use of acids of higher molecular weight than acetic acid or propionic acid. We have found that maleic anhydride, phthalic anhydride, abietic maleic or fumaric acid modified rosin, linseed oil fatty-acid, acidic compounds as obtained by reacting the equivalent of one molecular weight of a dibasic acid with the equivalent of one molecular weight of a dihydric alcohol or the like, may be used for acidifying purposes. We have also found that the alkaline dispersions may be neutralized by the action of phenol, cresol, other phenols, phenol alcohols, phenyl isothiocyanate or the like. The polyhydric alcohols of the dispersions when reacted with dibasic acids such as maleic acid or its anhydride, fumaric acid or the like, form soft resins which have a tendency to harden by oxidation. The alkyd resins as well as the proteins possess a high tolerance for moisture, and in case of printing inks made therefrom the contribution of the proteins in the composition resides in an increasing hardness. In other compositions such as employing rosin, diethylene glycol soluble pure phenol formaldehyde resins, and tricarboxylic acids obtained from diene modified rosin esters, the proteins do contribute hardness as well as water tolerance to the composition, whilst the resinous materials decrease the water absorption of the ink films.

Accordingly it is among the objects of this invention to provide protein dispersions which may be used for preparing printing inks having a great tolerance for moisture.

Another object of this invention is to provide printing inks which will set to hard, water resistant films when the printed films are exposed to moisture.

Another object of this invention is to provide for the economical production of dispersions which may be used for preparing printing inks.

The foregoing and other objects may be accomplished by using dispersions of which the following are illustrative embodiments:

Example I

| | Parts |
|---|---|
| Soybeans proteins containing from 95% upwards of pure protein | 20 |
| Guanidine carbonate | 3 |
| Dicyandiamide | 3 |
| Diethylene glycol | 74 |

are heated while stirring to 125–130° C. in about 15 minutes, held at this temperature for about 2 hours, then carefully the temperature is raised to 140° C. in about 15 minutes, and held to 140–145° C. to an apparent viscosity, at room temperature, of about 200 poises (about 30 minutes to 1 hour).

The resulting dispersion is mixed and milled with a coloring material, such as 25 parts carbon black.

Example II

The dispersion, as prepared in Example I, is neutralized with glacial acetic acid (about 4 parts). After cooling, it is mixed and milled with 35 parts Prussian blue.

Example III

| | Parts |
|---|---|
| Soybean proteins containing from 95% upwards of pure protein | 20 |
| Ethylene diamine | 4 |
| Diethylene glycol | 76 |

are heated while stirring to 130° C. in about 20 minutes and held between 130–135° C. to a viscosity at room temperature of about 300 poises (about 1½ to 2 hours), then, at 130–135° C. This vehicle is mixed and milled with 100 parts chrome yellow.

Example IV

The dispersion, as prepared in Example III, is neutralized with glacial acetic acid (about 4 parts). After cooling, it is mixed and milled with 35 parts Prussian blue.

Example V

| | Parts |
|---|---|
| Casein | 20 |
| Guanidine carbonate | 2 |
| Diethylene glycol | 78 |

are heated, while stirring, for 3 hours at 80° C. Toward the end of this time, 2 parts acetic anhydride are added, drop by drop. After cooling, 25 parts carbon black are mixed with the dispersion, and the mixture is passed over a three-roller ink mill.

Example VI

| | Parts |
|---|---|
| Casein | 20 |
| Guanidine carbonate | 3 |
| Diethylene glycol | 77 |

are heated, while stirring, for ½ hour at 110° C. Toward the end of this time, 10 parts phthalic anhydride are added, and the temperature is raised to 130–140° C. in about ten minutes and held there for one hour. After cooling, it is mixed and milled with 30 parts lithol red.

Example VII

| | Parts |
|---|---|
| Acid casein | 30 |
| Guanidine carbonate | 3 |
| Diethylene glycol | 67 |

are heated at 110° and stirred at this temperature for 1 hour, then, 16 parts phthalic anhydride are added gradually, and after addition the dispersion is heated at 110–120° C. for an additional hour. The vehicle is mixed and milled into an ink with 30 parts carbon black.

Example VIII

| | Parts |
|---|---|
| 20% soybean protein dispersion containing from 95% upwards of pure protein as prepared in Example I | 100 |
| A diethylene-glycol soluble partially polymerized indene | 20 |

are heated at 140° C. for 30 minutes, then 10 parts phthalic acid anhydride are added and the mixture is reacted for 1 hour. The resulting dispersion is mixed and milled into an ink with

| | Parts |
|---|---|
| Diethylene glycol | 20 |
| Carbon black | 40 |

Example IX

| | Parts |
|---|---|
| Soybean protein having from 95% upwards of pure protein content | 20 |
| Methylamine (crude) | 4 |
| Diethylene glycol | 76 |

are heated, while stirring, to 125–130° C. in about 15 minutes, held at this temperature for about 1 hour, then carefully the temperature is raised to 130° C. in about 10 minutes and held at this temperature for 2 hours. At the end of this reaction period

| | Parts |
|---|---|
| Maleic anhydride | 30 |
| A soft phenolic-modified indene-coumarone resin | 10 |

are added toward the end of this period. The resulting dispersion is mixed with 60 parts lithol red and passed over a three-roller ink mill.

Example X

| | |
|---|---|
| Soybean protein having from 95% upwards of pure protein content | 30 |
| Ethylene diamine | 2 |
| Ethylene glycol | 68 |

are heated while stirring at 140° C. for 1 hour, then,

| | Parts |
|---|---|
| Rosin | 10 |
| Phthalic anhydride | 90 |

are added and the mixture is continued to be heated at 140° C. for 3 hours,

| | Parts |
|---|---|
| Diethylene glycol | 60 |
| Carbon black | 60 |

are mixed with this dispersion and the mixture is milled into an ink.

Example XI 100 parts of 20% soybean protein dispersion containing from 95% upwards of pure protein, as prepared in Example III
5 parts diethylene glycol soluble pure phenol-formaldehyde resin, dissolved in
10 parts triethylene glycol are heated at 140° C. for 20 minutes, then 30 parts of phthalic anhydride are added and the mixture is heated for 1 hour at 130–140° C. This dispersion is mixed and milled into an ink with

| | Parts |
|---|---|
| Diethylene glycol | 30 |
| Chrome yellow | 200 |

Example XII

| | Parts |
|---|---|
| Soybean protein having from 95% upwards of pure protein content | 30 |
| Ethylene diamine | 2 |
| Ethylene glycol | 68 |

are mixed well, and heated to 135° C. in 30 minutes and kept between 135–145° C. while stirring and adding

| | Parts |
|---|---|
| Rosin | 10 |
| Phthalic anhydride | 90 |

and the mixture is held between 135–145° C. for 2 hours. Then it is diluted with 60 parts diethylene glycol. The resulting vehicle is mixed and milled with 100 parts lithol red.

Example XIII

| | Parts |
|---|---|
| Soybean having from 95% upwards of pure protein content | 30 |
| Guanidine carbonate | 3 |
| Ethylene glycol | 67 |

heated to 125° C. in ½ hour, held at 120–130° C. for 2 hours, then

| | Parts |
|---|---|
| Phthalic acid anhydride | 84 |
| Rosin | 8 |

are added and heated for 1 hour between 130–140° C. While cooling, below 110° C., the viscous vehicle is thinned with 50 parts diethylene glycol. The vehicle is mixed and milled with 300 parts of chrome yellow.

Example XIV

| | Parts |
|---|---|
| Casein | 40 |
| Ethylene diamine | 6 |
| Ethylene glycol | 54 |

are mixed well and allowed to stand at room temperature, overnight. Then it is heated to 130–140° C. in about 30 minutes, when there is added 120 parts phthalic anhydride. The mixture is stirred at 130–140° C. for two hours, then it is cooled and 80 parts diethylene glycol are added. This dispersion, after cooling is mixed and milled with 250 parts chrome yellow.

Example XV

| | Parts |
|---|---|
| Casein | 30 |
| Ethylene diamine | 2 |
| Ethylene glycol | 68 |

are heated to 110° C. in about 30 minutes, at 110° C., add,

| | Parts |
|---|---|
| Rosin G | 10 |
| Phthalic anhydride | 90 |

and heat for 2 hours at 135–145° C., then add, 60 parts diethylene glycol and cool. The vehicle is mixed with 85 parts lithol red and the mixture is milled on a three-roller ink mill.

We have found that glycerol and glycols other than those heretofore described may be used in preparing the dispersions. Among these glycols are propylene glycol-dipropylene and tetraethylene glycol. The various glycols of the olefines described herein may be designated as "alkylene glycols."

Pigments and coloring materials either of organic or inorganic character which impart coloring to the dispersions rendering them useful as printing ink, may be designated as "pigments."

We have found that other effective peptizing agents, in addition to those heretofore described, for dispersing the proteins are the following nitrogenous compounds: dimethylamine, diethylamine, diethylaminoethanol, n-butylamine, dibutylamine, propylene diamine, diethylene triamine, dipropylene triamine, triethylene tetraamine, ammonia (aqueous solution) and aldehyde ammonia. We have also found that dispersions of the proteins may be prepared by using other compounds for the peptization. These are: ammonium bicarbonate, ammonium chloride, ammonium nitrate, ammonium thiocyanate, phthalic anhydride, maleic anhydride, acetic acid, ammonium sulfate, ammonium oxalate, aniline, phenol, nitroethane, nitropropane, nitrobenzene, calcium hydroxide, urea, thiourea and 2-nitro-2-methyl-1,3-propanediol. The foregoing compounds and those heretofore described in the examples may be designated as "peptizing agents."

Having described our invention, we claim:

1. A dispersion consisting of a soybean protein containing from 95% upwards of pure protein, a polyhydric alcohol selected from the group consisting of ethylene glycol and diethylene glycol, and a protein peptizing agent, said peptizing agent being guanidine carbonate.

2. A dispersion consisting of a soybean protein containing from 95% upwards of pure protein, diethylene glycol, a peptizing agent, the peptizing agent being guanidine carbonate, and a pigment.

3. A dispersion consisting of a soybean protein containing from 95% upwards of pure protein, dispersed in a polyhydric alcohol, a resin, a peptizing agent and a pigment: wherein the polyhydric alcohol is selected from the group consisting of ethylene glycol and diethylene glycol, the peptizing agent being guanidine carbonate.

4. A printing ink essentially consisting of a dispersion of soybean protein containing from 95% upwards of pure protein in diethylene glycol, the said protein being peptized by the action of guanidine carbonate; a resin and a pigment.

5. A printing ink essentially consisting of a dispersion of a soybean protein having from 95% upwards of pure protein in diethylene glycol, the said protein being peptized by the action of guanidine carbonate, and a pigment.

6. A dispersion consisting of a soybean protein containing from 95% upwards of pure protein, ethylene glycol, a peptizing agent, the peptizing agent being guanidine carbonate, and a pigment.

7. A printing ink essentially consisting of a dispersion of soybean protein containing from 95% upwards of pure protein in ethylene glycol, the said protein being peptized by the action of guanidine carbonate; a resin and a pigment.

8. A printing ink essentially consisting of a dispersion of a soybean protein having from 95% upwards of pure protein in ethylene glycol, the said protein being peptized by the action of guanidine carbonate, and a pigment.

*9. A printing ink vehicle consisting essentially of a dispersion of a binder, a protein peptizing agent and a substantially anhydrous hygroscopic liquid, said binder consisting essentially of a dry, substantially anhydrous, non-prolamine protein having high water tolerance and being dispersible in nitrogen base material, said protein being dispersed by the action of said peptizing agent, said liquid consisting essentially of a polyhydric alcohol having 2–3 hydroxy groups and 2–8 carbon atoms, said printing ink vehicle having a high humidity and water tolerance and being readily settable on exposure to steam.*

*10. A printing ink vehicle consisting essentially of a dispersion of a binder, a protein peptizing agent and a substantially anhydrous hygroscopic liquid, said binder consisting essentially of a dry, substantially anhydrous non-prolamine protein having high water tolerance and being dispersible in nitrogen base material, said protein being dispersed by the action of the protein peptizing agent, said peptizing agent being a nitrogen containing compound and said liquid consisting essentially of a polyhydric alcohol having from 2 to 3 hydroxy groups and 2 to 8 carbon atoms, said printing ink vehicle having a high humidity and water tolerance and being readily settable on exposure to steam.*

*11. A printing ink vehicle consisting essentially of a dispersion of a binder, a protein peptizing agent and a substantially anhydrous hygroscopic liquid, said binder consisting essentially of a dry, substantially anhydrous non-prolamine protein, having high water tolerance and being dispersible in nitrogen base material, said protein being dispersed by the action of the protein peptizing agent, said peptizing agent being a basic soluble amino compound and said liquid consisting essentially of a polyhydric alcohol having from 2 to 3 hydroxy groups and 2 to 8 carbon atoms, said printing ink vehicle having a high humidity and water tolerance and being readily settable on exposure to steam.*

*12. A printing ink vehicle consisting essentially of a dispersion of a binder, a protein peptizing agent and a substantially anhydrous hygroscopic liquid, said binder consisting essentially of a dry, substantially anhydrous soybean protein dispersed by the action of the protein peptizing agent, said peptizing agent being a nitrogen containing compound and said liquid consisting essentially of a polyhydric alcohol having from 2 to 3 hydroxy groups and 2 to 8 carbon atoms, said printing ink vehicle having a high humidity and water tolerance and being readily settable on exposure to steam.*

*13. A printing ink vehicle consisting essentially of a dispersion of a binder, a protein peptizing agent and a substantially anhydrous hygroscopic liquid, said binder consisting essentially of a dry, substantially anhydrous non-prolamine protein*

*having high water tolerance and being dispersible in nitrogen base material, said protein being dispersed by the action of the protein peptizing agent, and said liquid consisting essentially of a polyhydric alcohol selected from the group of diethylene glycol and ethylene glycol, said printing ink vehicle having a high humidity and water tolerance and being readily settable on exposure to steam.*

*14. A printing ink vehicle consisting of a dispersion of a binder, a protein peptizing agent, and a substantially anhydrous hygroscopic liquid, said binder consisting essentially of a dry, substantially anhydrous non-prolamine protein having high water tolerance and being dispersible in nitrogen base material, said protein being dispersed by the action of the protein peptizing agent, said peptizing agent being a basic soluble amino compound, and said liquid consisting essentially of a polyhydric alcohol selected from the group of diethylene glycol and ethylene glycol, said printing ink vehicle having a high humidity and water tolerance and being readily settable on exposure to steam.*

*15. A printing ink vehicle consisting essentially of a dispersion of a binder, a protein peptizing agent and a substantially anhydrous hygroscopic liquid, said binder consisting essentially of a dry, substantially anhydrous non-prolamine protein having high water tolerance and being dispersible in nitrogen base material, said protein being dispersed by the action of the protein peptizing agent, said peptizing agent being a nitrogen containing compound, and said liquid consisting essentially of a polyhydric alcohol selected from the group of diethylene glycol and ethylene glycol, said printing ink vehicle having a high humidity and water tolerance and being readily settable on exposure to steam.*

*16. A printing ink consisting of coloring matter in a dispersion of a resin binder, a protein binder, a protein peptizing agent and a substantially anhydrous hygroscopic liquid, said binder consisting essentially of a dry, substantially anhydrous non-prolamine protein having high water tolerance and being dispersible in nitrogen base material, said protein being dispersed by the action of the protein peptizing agent, and said liquid consisting essentially of a polyhydric alcohol having from 2 to 3 hydroxy groups and 2 to 8 carbon atoms, said printing ink having a high humidity and water tolerance and being readily settable on exposure to steam.*

*17. A printing ink consisting of coloring matter in a dispersion of a resin binder, a protein binder, a protein peptizing agent and a substantially anhydrous hygroscopic liquid, said binder consisting essentially of a dry, substantially anhydrous, non-prolamine protein having high water tolerance and being dispersible in nitrogen base material, said protein being dispersed by the action of the protein peptizing agent, said peptizing agent being a basic soluble amino compound, and said liquid consisting essentially of a polyhydric alcohol having from 2 to3 hydroxy groups and 2 to 8 carbon atoms, said printing ink having a high humidity and water tolerance and being readily settable on exposure to steam.*

*18. A printing ink consisting of coloring matter in a dispersion of a resin binder, a protein binder, a protein peptizing agent and a substantially anhydrous hygroscopic liquid, said binder consisting essentially of a dry, substantially anhydrous non-prolamine protein having high water tolerance and being dispersible in nitrogen*

*base material, said protein being dispersed by the action of a protein peptizing agent, said peptizing agent being a nitrogen containing compound and said liquid consisting essentially of a polyhydric alcohol having from 2 to 3 hydroxy groups and 2 to 8 carbon atoms, said printing ink having a high humidity and water tolerance and being readily settable on exposure to steam.*

*19. A printing ink consisting of coloring matter in a dispersion of a resin binder, a protein binder, a protein peptizing agent and a substantially anhydrous hygroscopic liquid, said binder consisting essentially of a dry, substantially anhydrous non-prolamine protein having high water tolerance and being dispersible in nitrogen base material, said protein being dispersed by the action of the protein peptizing agent, said peptizing agent being a nitrogen containing compound, and said liquid consisting essentially of a polyhydric alcohol selected from the group consisting of ethylene glycol and diethylene glycol, said printing ink having a high humidity and water tolerance and being readily settable on exposure to steam.*

*20. A printing ink consisting of coloring matter in a dispersion of a resin binder, a protein binder, a protein peptizing agent and a substantially anhydrous hygroscopic liquid, said binder consisting essentially of a dry, substantially anhydrous non-prolamine protein having high water tolerance and being dispersible in nitrogen base material, said protein being dispersed by the action of the protein peptizing agent, and said liquid consisting essentially of a polyhydric alcohol selected from the group of diethylene glycol and ethylene glycol, said printing ink having a high humidity and water tolerance and being readily settable on exposure to steam.*

*21. A printing ink consisting of coloring matter in a dispersion of a resin binder, a protein*

*binder, a protein peptizing agent and a substantially anhydrous hygroscopic liquid, said binder consisting essentially of a dry, substantially anhydrous non-prolamine protein having high water tolerance and being dispersible in nitrogen base material, said protein being dispersed by the action of the protein peptizing agent, said peptizing agent being a basic soluble amino compound, and said liquid consisting essentially of a polyhydric alcohol selected from the group of diethylene glycol and ethylene glycol, said printing ink having a high humidity and water tolerance and being readily settable on exposure to steam.*

ALFRED F. SCHMUTZLER.
DONALD F. OTHMER.

REFERENCES CITED

The following references are of record in the file of this patent or the original patent:

UNITED STATES PATENTS

| Number | Name | Date |
|---|---|---|
| 1,962,823 | Kurz et al. | June 12, 1934 |
| 2,185,110 | Coleman | Dec. 26, 1939 |
| 2,198,596 | Atwood | Apr. 30, 1940 |
| 2,292,624 | Fawthrop | Aug. 11, 1942 |
| 2,298,269 | Atwood | Oct. 13, 1942 |
| 2,309,380 | Brother | Jan. 26, 1943 |
| 2,324,105 | Nadeau | July 13, 1943 |
| 2,335,882 | Pingarron | Dec. 7, 1943 |

FOREIGN PATENTS

| Number | Country | Date |
|---|---|---|
| 20,249 of 1934 | Australia | Aug. 29, 1935 |

OTHER REFERENCES

Industrial and Engineering Chemistry, Nov. 1943, pages 1196 to 1202.